ABSTRACT

United States Patent [19]
Seidel et al.

[11] Patent Number: 4,800,909
[45] Date of Patent: Jan. 31, 1989

[54] CLAMP FOR UMBRELLA STICK

[75] Inventors: Joachim Seidel, Solingen; Klaus Stiller, Langenfeld, both of Fed. Rep. of Germany

[73] Assignee: Kortenbach Verwaltungs-und Beteiligungsgesellschaft MbH & Co., Soligen, Fed. Rep. of Germany

[21] Appl. No.: 97,695

[22] Filed: Sep. 17, 1987

[30] Foreign Application Priority Data

Oct. 15, 1986 [DE] Fed. Rep. of Germany ....... 3635097

[51] Int. Cl.⁴ ............................................. A47B 37/04
[52] U.S. Cl. .................................. 135/16; 135/20 R; 135/DIG. 9; 403/24
[58] Field of Search ................. 135/16, 20 R, DIG. 9; 403/24, 195, 196

[56] References Cited

U.S. PATENT DOCUMENTS 2,839,320  6/1958  Hill ................................ 135/DIG. 9
4,353,659 10/1982  Comte .................................... 403/24

FOREIGN PATENT DOCUMENTS 33856  7/1959  Switzerland .

Primary Examiner—J. Karl Bell
Attorney, Agent, or Firm—Samuel Meerkreebs

[57] ABSTRACT

A clamping device of a static umbrella (e.g. the frame of a garden or beach umbrella) has a segment which is flexibly connected to a bush which surrounds an umbrella stick. A handle rotatably mounted in a boss attached to the bush is able to overcome the natural springiness of the segment to move it towards the umbrella stick so that a clamping cheek of the segment holds the umbrella stick in position relative to a base tube. With this construction, the device need have no longitudinal split, which would expose the mechanism to the effects of the weather, and the mechanism is enclosed, thereby preventing the umbrella stick or users from being hurt on the sharp corners and edges of the mechanism.

9 Claims, 1 Drawing Sheet

CLAMP FOR UMBRELLA STICK

FIELD OF THE INVENTION

The invention relates to a static umbrella which has a clamping device releasably securing an umbrella stick in a selected position telescopically in the top of a tube which is, in use, supported by a base.

DESCRIPTION OF RELATED ART

Static umbrellas such as for garden, balcony or beach have clamping devices for thus securing their sticks (see, for example, Swiss Pat. No. 338,567 of July 15, 1959). These devices have a cuff in the form of a C-shaped clip, the free ends of which are bent out at an angle and through which extends a screw or a screw-threaded clamp handle. The screw or the screw-threaded clamp handle is used to pull together the open ends of the cuff. This narrows the passage through the cuff and thereby ensures that the stick of the umbrella frame is clamped firmly in the tube attached to the base.

This type of clamping device has the form of a C-shaped structure which can be pulled together to the extent of the width of the slit between its ends and which can grip the umbrella stick with its inner face. The clamping screw or the screw-threaded spindle which pulls the ends together merely acts upon the angled-out ends of the cuff at the side of the umbrella stick without touching the umbrella stick, so that the stick remains protected against scratches, abrasion and similar damage. This contrasts with clamping devices which use screws and the like in direct engagement with the stick of the umbrella frame.

What is disadvantageous in the case of cuffs or clips which are tightened by screw-threaded elements is that their angled-out ends and also the screw means project from the cuffs or clips in an awkward way and their sharp edges and corners often cause injuries and damage during handling of the umbrella. The screw means are, also, through their completely open arrangement, exposed to the influences of the weather without any protection, and they are therefore subject to severe corrosive action so that after a period of time they become harder to use or rust up completely.

SUMMARY OF THE INVENTION

It is therefore an object of the present invention to provide a static umbrella having a clamping device for mounting an umbrella stick in the top of a tube supported by a base without any formations or parts projecting out in an awkward manner, so as to prevent injuries or damage during handling of the umbrella and corrosive action upon the clamping device, in order that, even after a long period of use, the device may still be operated easily at any time.

In accordance with the present invention, a static umbrella comprises a tube which is, or is arranged to be, supported by a base, a stick telescopically located in the top of the tube and carrying at its upper end a canopy framework, and a clamping device mounted on top of the tube for releasably clamping the stick, the clamping device including a cuff having an annular bush with a passageway therethrough in which are located the stick and the tube, a segment of the cuff having a clamping cheek for abutting against the umbrella stick, the clamping cheek defining part of the passageway and the segment being connected flexibly to the bush; and screw-threaded adjustment means for flexing the segment relatively to the bush to bring the clamping cheek of the segment into frictional contact with the umbrella stick. Preferably, the segment and the screw-threaded adjustment means work within a boss projecting from the bush.

This clamping device may be enclosed and compact. Thus, it does not have a longitudinal slitting or a gap in the bush, the edges and corners of the cuff do not stand out in an awkward way and the screw-threaded adjustment means is not exposed and does not project out obstructively. The cuff may clasp both the tube and the umbrella stick by nearly invisible or unnoticed encapsulated clamping means. Therefore, not only is the risk avoided of injuries or damage to clothing during handling of the umbrella, but also the whole clamping mechanism is protected against the effect of the weather and corrosion, so that even after years of use the device is easy to operate and functions safely. Furthermore, the construction in accordance with the invention is not significantly more complex or expensive than those incorporating known clamping devices.

Preferably, resiliency of the cuff biases the segment outwards against the screw-threaded adjustment means. This makes use of the elasticity of the cuff.

If the segment comprises a tubular portion, the cuff further comprises an abutment portion spaced from the segment and the screw-threaded adjustment means has a screw-threaded spindle which passes through the tubular portion and is screw-threadably engaged with the abutment portion, the segment and the abutment portion lying on opposite sides of an axial plane of the bush, then the abutment portion may be slidably, but non-rotatably mounted, in the cuff along the axis of the screw-threaded spindle. Furthermore, the abutment portion may have a clamping cheek for abutting against the umbrella stick, this clamping cheek defining part of the passageway through the bush, the arrangement being such that actuation of the screw-threaded adjustment means brings the clamping cheeks of both the segment and the abutment portion into frictional contact with the umbrella stick. By providing two clamping cheeks, the umbrella stick is gripped more effectively.

If the tubular portion, the abutment portion and the screw-threaded adjustment means lie along an axis transverse to and offset from the axis of the bush and are mounted in the boss projecting from the side of the bush, then the bush and boss may be integral with one another, thereby improving the safety and environmental protection of the device. Conveniently, the segment when viewed along the transverse axis has a C-shaped profile with the flexible connection to the bush being where the boss blends into the bush.

Other and further objects, purposes, advantages, utilities, and features will become apparent to those skilled in the art from a reading of the present specification and drawings, forming a part thereof in which:

IN THE DRAWING

DESCRIPTION OF A PREFERRED EMBODIMENT

Figure 2:
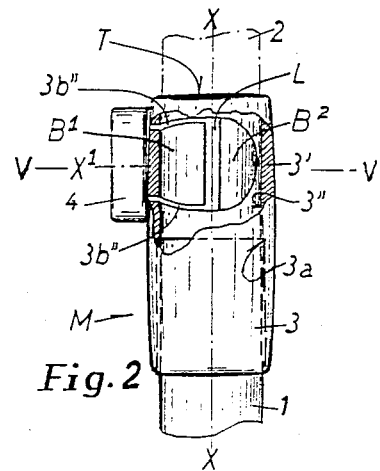
FIG. 2 is a side view, with a portion broken away, of the arrangement shown in FIG. 1 when viewed from about 45° further around.
Figure 1:
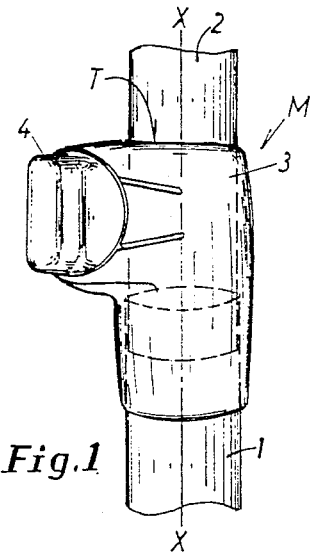
FIG. 1 is a perspective view of part of a static umbrella frame in accordance with the present invention, showing a clamping device of the frame in combination with a partially shown umbrella stick and tube.
Figure 3:
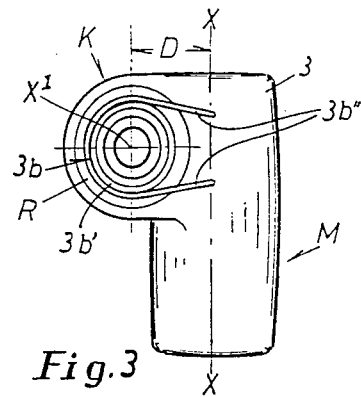
FIG. 3 is a front view of a cuff of the clamping device of FIGS. 1 and 2.
Figure 4:
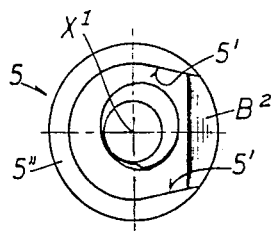
FIG. 4 is an end view of an abutment portion of the clamping device of FIGS. 1 and 2; and, FIG. 5 is an enlarged sectional/cut-away view taken on the line V—V in FIG. 2.

A static umbrella frame, parts of which are not shown, for example, a frame for a garden, balcony or beach umbrella, is provided with a base (not shown) to which a tube 1 is rigidly fitted. Alternatively, the tube may be supported by a passage through a table. Into the tube 1, which in the drawings is only partially shown, is pushed an umbrella stick 2 (only a piece of which is shown) which may be fixed at a given height in the tube 1 by a manually operable clamping device. The stick carries a canopy framework (not shown) at its upper end. The clamping device is rigidly fixed to the top end of the tube 1 and has a cuff M in the form of a bush 3. The tube 1 projects into the bush 3 from below as far as a ledge or shoulder $3a$, where it is seated firmly. The width of the shoulder of the ledge $3a$ is arranged to be equal to the thickness of the wall of the tube 1 so that the inner diameter of the tube corresponds approximately to the inner diameter of the bush above the ledge $3a$. In this way, there is formed a telescopic passage T for the umbrella stick 2 so that the bush 3 clasps the tube 1 and the umbrella stick 2 around their circumferences.

Above the ledge $3a$, there is cut out in the wall $3'$ of the bush 3 (which is preferably produced from impact-resistant plastics) a springy segment $3b$ extending transversely to the axis X of the bush in the shape of a horseshoe, so that the segment $3b$ may be resiliently pressed in radially into the telescopic passage T. The segment $3b$ is provided with a tubular portion $3b'$ which is centered to swing freely in an annular gap R which surrounds it in a boss K moulded onto the bush 3. Around the tubular piece $3b'$ run slits $3b''$ which outline the horseshoe shape of the segment $3b$ and which preferably join the bush 3 in such a way that the springy segment $3b$, by having a clamping cheek $B^1$ with the curvature of the umbrella stick 2, occupies approximately one quarter of the inner surface of the passage T in the bush 3.

Figure 5:
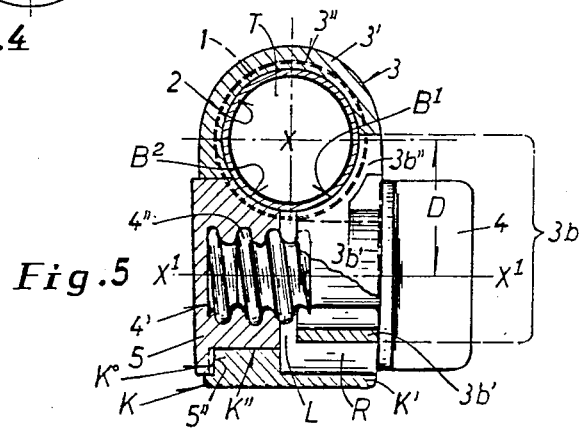

A screw-threaded clamp handle 4 has a screw-threaded spindle $4''$ which passes freely through the tubular portion $3b'$ centered in the Boss K. An end $4'$ of the spindle $4''$ is engaged in an internally screw-threaded abutment portion 5 lying on the opposite side of an axial plane of the bush 3 to the tubular portion $3b'$. The abutment portion is arranged to be able to slide in a channel $K''$ in the boss K coaxially with respect to the tubular portion $3b'$ and is separated from the tubular portion $3b'$ by an airgap L. The abutment portion 5 is designed to be non-rotatable by virtue of flat guide surfaces $5'$ and a correspondingly adapted contour of the channel $K''$ and it has a clamping cheek $B^2$ with the curvature of the umbrella stick 2. A flange $5''$ moulded onto the abutment portion 5 and a stop ledge $K''$ in the channel $K''$ limit the depth of entry of the abutment portion 5 into the channel $K''$ and thereby also restrict the extent to which the cheek $B^2$ can be drawn towards the umbrella stick 2, as may be seen from FIG. 5. If, because of rather excessive length of the abutment portion relative to that of the channel $K''$, the flange $5''$ in use does not come into contact with the stop ledge $K°$, the cheek $B^2$ just like the clamping cheek $B^1$ is able to slide in and out relatively to the umbrella stick 2, so that the two cheeks $B^1$ and $B^2$ are able to slide towards one another until they are both in firm contact with the umbrella stick 2.

The boss K, the handle 4, the tubular portion $3b'$ of the segment $3b$ and the abutment portion 5 lie along an axis $X'$ transverse to and offset (by a distance D) from the axis X of the bush 3, such that the configuration of the cheeks $B^1$ and $B^2$ (which may be seen in FIG. 5) provides a clamping mechanism for the umbrella stick 2. The compact and effective clamping cuff acts like the well known annular-clip cuff without direct action upon the umbrella stick 2 by the handle 4 but also without the necessity of longitudinal slitting of the cuff and without exposed sharp corners, edges or other parts.

The umbrella stick 2 is fixed in the clamping device merely by turning the handle 4 clockwise. By doing this, the handle 4 pulls the abutment portion 5 into the channel $K''$ as far as the ledge $K°$. Further turning of the handle 4 presses the tubular portion $3b'$ into the airgap L until the cheek $B^1$ of the segment $3b$ comes into firm contact with the umbrella stick 2. If the length of the abutment portion 5 results in it not being brought into abutment with the stop ledge $K°$, the handle 4 pulls both cheeks $B^1$ and $B^2$ towards one another to provide still more effective clamping of the umbrella stick 2. To loosen the clamping of the umbrella stick 2, the handle 4 is twisted anti-clockwise with the result that the segement $3b$ in contact with the handle 4 swings springly outwards and the cheek $B^1$, which was being pressed radially inwards against the umbrella stick 2 in the passage T, comes out of contact with the umbrella stick 2. The stick 2 may now be removed from the clamping device or moved up or down into a new position, which it may be held at by turning the handle 4 clockwise again.

We claim:

1. For use in a static umbrella, a base-tube which is adapted to be supported vertically, an umbrella stick removably and telescopically located in the top of said base-tube and for carrying, at its upper end, a canopy framework of the umbrella, and a clamping device mounted on the upper end of said base-tube for releasably clamping the lower end of the telescoped stick, said clamping device including a cuff having an annular bush defining at its upper end a passageway providing an entry opening for said umbrella stick and at its lower end a rigid enclosure of the base tube, said cuff defining a lateral projection of said annular bush and enclosing a flexible segment defining a clamping cheek for abutting against said telescoped umbrella stick, said clamping cheek being swingably arranged within said passageway and within said cuff and connected flexibly to said bush, and a screw-threaded adjustment means within said lateral projection and operatively connected to said segment for flexing said segment inward into said passageway relative to said bush to reduce said passageway and to bring said clamping cheek of said segment into frictional contact with said unbrella stick whereby substantially the entire outer surface of the stick is tightly gripped.

2. The structure according to claim 1, wherein said flexible segment and said screw-threaded adjustment means are displaced operates within a boss projecting from said bush.

3. The structure according to claim 1, wherein said cuff is resilient and said segment outwards against said screw-threaded adjustment means.

4. The structure according to claim 1, wherein said segment comprises a tubular portion, said cuff includes an abutment portion spaced from said segment, said screw-threaded adjustment means has a screw-threaded spindle which passes through said tubular portion and is screw-threadably engaged with said abutment portion, said segment and said abutment portion lying on opposite sides of an axial plane of said bush.

5. The structure according to claim 4, wherein said abutment portion is slidably and non-rotatably mounted in said cuff along the axis of said screw-threaded spindle.

6. The structure according to claim 5, wherein said abutment portion is provided with a flange for limiting the depth to which it can be pulled into said cuff by said screw-threaded spindle.

7. The structure according to claim 5, wherein said abutment portion has a clamping cheek for abutting against said umbrella stick, said clamping cheek defining part of said passageway through said bush, the arrangement being such that actuation of said screw-threaded adjustment means brings said clamping cheeks of both said segment and said abutment portion into frictional contact with said umbrella stick.

8. The structure according to claim 4, wherein said tubular portion, said abutment portion and said screw-threaded adjustment means lie along an axis transverse to and offset from the axis of said bush and are mounted in the boss projecting from the side of said bush.

9. The structure according to claim 8, wherein said segment, when viewed along said transverse axis, has a C-shaped profile with said flexible connection to said bush at a position where said boss blends into said bush.

* * * * *